United States Patent [19]

Kouketsu et al.

[11] Patent Number: 4,607,864
[45] Date of Patent: Aug. 26, 1986

[54] WEBBING SUPPORT DEVICE

[75] Inventors: Eiji Kouketsu, Niwa; Masato Tsumagari, Ikeda, both of Japan

[73] Assignees: Kabushiki Kaisha Tokai-Rika-Denki-Seisakusho, Aichi; Daihatsu Motor Co., Osaka, both of Japan

[21] Appl. No.: 638,661

[22] Filed: Aug. 7, 1984

[30] Foreign Application Priority Data

Aug. 8, 1983 [JP] Japan .......................... 58-122994[U]

[51] Int. Cl.⁴ ............................................. B60R 21/10
[52] U.S. Cl. .................... 280/808; 297/483; 297/486
[58] Field of Search ............... 280/801, 802, 804, 807, 280/808; 297/474, 475, 476, 481, 468, 464, 482–486

[56] References Cited

U.S. PATENT DOCUMENTS

| 3,567,247 | 3/1971 | Sobkow et al. | 280/808 |
| 3,860,261 | 1/1975 | Takada | 297/483 |
| 3,907,329 | 9/1975 | Erion et al. | 280/808 |
| 4,056,271 | 11/1977 | Imabuchi et al. | 280/808 |
| 4,323,278 | 4/1982 | Sukopp et al. | 280/808 |
| 4,400,013 | 8/1983 | Imai | 280/808 |
| 4,461,510 | 7/1984 | Cunningham et al. | 297/483 |
| 4,466,666 | 8/1984 | Takada | 297/483 |
| 4,469,352 | 9/1984 | Korner et al. | 280/808 |

FOREIGN PATENT DOCUMENTS 2449105 4/1975 Fed. Rep. of Germany ...... 297/483

Primary Examiner—Richard A. Bertsch
Attorney, Agent, or Firm—Sixbey, Friedman & Leedom

[57] ABSTRACT

In a webbing support device adapted for use in a seatbelt system for supporting an intermediate portion of an occupant restraining webbing on a vehicle body, a webbing supporting member capable of supporting the webbing is provided in addition to a slip joint supporting the webbing on the vehicle body.

Accordingly, an anchor point of the webbing to the vehicle body can be changed corresponding to physical build of an occupant restrained by the webbing.

22 Claims, 6 Drawing Figures

WEBBING SUPPORT DEVICE

BACKGROUND OF THE INVENTION

1. Field of the Invention

The present invention relates to a webbing support device adapted for use in a seatbelt system for supporting an intermediate portion of the webbing on a vehicle body.

2. Description of the Prior Art

Among seatbelt systems of various types in one using a continuous occupant restraining webbing an intermediate portion of the occupant restraining webbing positioned between a webbing retractor retracting the webbing therein and a torso of the occupant is supported on a side wall of the vehicle body through a slip joint. The slip joint allows the intermediate portion of the webbing to be moved freely in its longitudinal direction, whereby the occupant is capable of changing his attitude voluntarily in a restrained situation by the webbing.

Also, the slip joint is constructed toughly so as to sustain a large tension acting on the webbing in the emergency situation of the vehicle and transmit it to the vehicle body reliably, and it is securely mounted on the side wall of the vehicle body.

Accordingly, when an occupant having a very small physical build, a child or so is restrained by the webbing, he is obliged to be kept in an unnatural attitude or in some cases the webbing touches his face, which hurts his feelings.

SUMMARY OF THE INVENTION

In view of the above facts, the present invention has as its object the provision of a webbing support device for supporting an intermediate portion of an occupant restraining webbing in which even when an occupant having a physical build different from a normal physical build is restrained by the webbing a position at which the webbing is supported on a vehicle body can be changed in accordance with the physical build.

In the webbing support device for supporting an intermediate portion of the occupant restraining webbing, a webbing supporting member capable of supporting the webbing is mounted on a side wall of the vehicle body for a slip joint supporting the webbing in addition to the slip joint, whereby a portion of the webbing positioned between the slip joint and a torso of the occupant is supported turnedly to the webbing supporting member so that an anchor point of the webbing for the torso of the occupant can be changed corresponding to physical build of an occupant restrained by the webbing.

Description will hereinunder be given of embodiments of the present invention with reference to the drawings attached hereto.

PREFERRED EMBODIMENTS OF THE INVENTION

Figure 1:
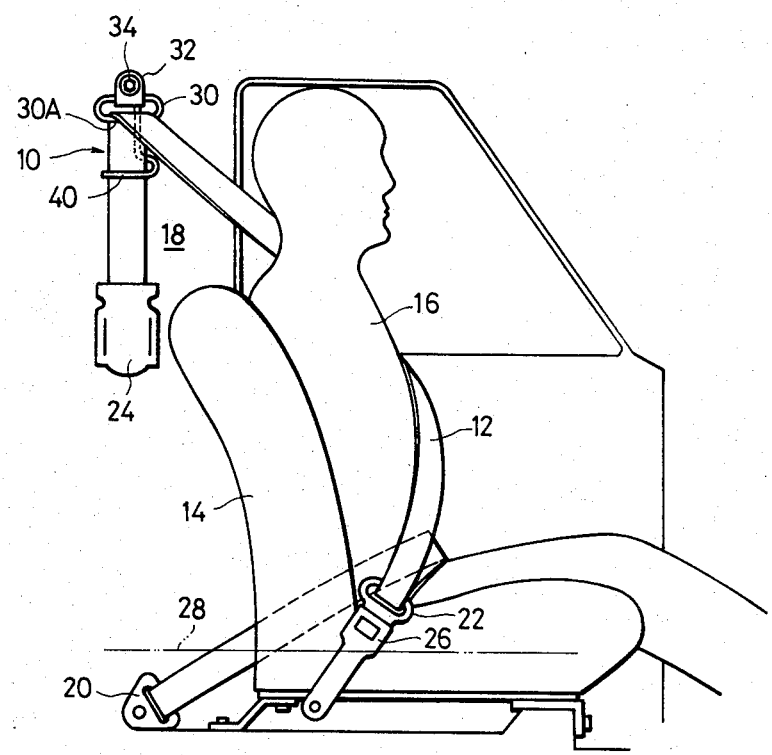
FIG. 1 is a front view showing a seatbelt system to which a webbing support device for supporting an intermediate portion of an occupant restraining webbing according to the present invention, seen from a side of a vehicle.

In FIG. 1, there is shown a seatbelt system to which a webbing support device 10 for supporting an intermediate portion of an occupant restraining webbing according to a first embodiment is applied.

The seatbelt system is constructed in such a manner that an occupant 16 sitting on a seat 14 is put in a restrained situation by an occupant restraining webbing 12 in an emergency situation of a vehicle. The webbing 12 is secured at its one end portion to an anchor plate 20 fixed to a side wall 18 of a vehicle body. An intermediate portion of the webbing 12 is turned back by a tongue plate 22 and the webbing support device 10, and it is retracted from the other end portion of the webbing 12 into a webbing retractor 24.

The webbing retractor 24 is fixed to the side wall 18 of the vehicle body, and it is constructed so as to retract the webbing 12 from the other end portion thereof. The webbing retractor 24 is provided with an inertial locking mechanism stopping an unwinding of the webbing 24 instantaneously in the emergency situation of the vehicle.

In addition, the tongue plate 22 can be latched to a buckle device 26 which is fixed to a tunnel portion 28 formed projectingly on a substantially central portion of a floor of the vehicle in a front and a rear directions of the vehicle, so that the buckle device 26 is disposed adjacent to a side portion of the seat 14.

Figure 2:
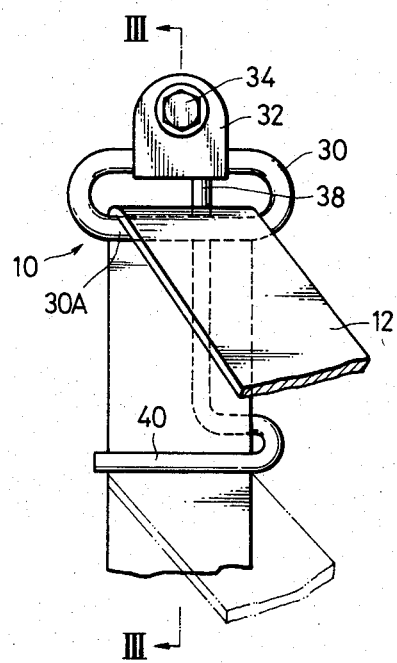
FIG. 2 is a partially enlarged view of FIG. 1.
Figure 3:
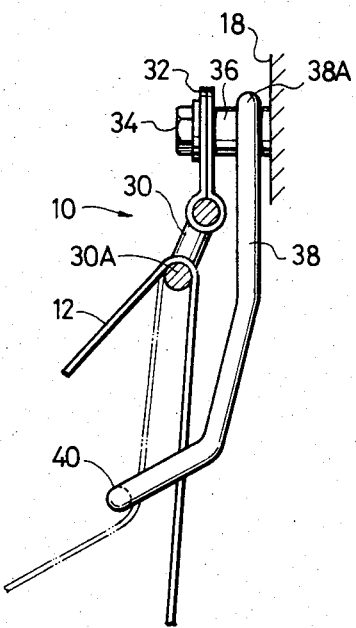
FIG. 3 is a sectional view taken along a line III—III of FIG. 2.

The webbing support device 10 will now be described in detail in accordance with FIGS. 2 and 3.

The webbing support device 10 includes a slip ring 30 for turning and supporting the webbing 12 as well as a conventional webbing support means, and the webbing 12 unwound from the webbing retractor 24 is turned back and supported by the slip ring 30. That is to say, the slip ring 30 is made of rod material having a sectional configuration of a circular shape and it is formed in an oval shape having two sides substantially parallel to each other. One of the sides is applied for turning and supporting the webbing 12 as a supporting portion 30A and the other thereof is secured with a connecting plate 32. The connecting plate 32 is penetrated by a mounting bolt 34, as is mounting means, which is screwed into the side wall 18 of the vehicle body, so that the slip ring 30 is mounted on the side wall 18. Disposed between the side wall 18 and the connecting plate 32 is a spacer 36 of a tubular shape penetrated by the mounting bolt 34, whereby the connecting plate 32 and the slip ring 30 are kept in rotatable situations about the mounting bolt 34. Thus, the slip ring 30 and the connecting plate 32 constitute a slip joint.

Suspended from the spacer 36 is a webbing supporting member 38 made of rod material through its one end portion bent in a U shape, so that the webbing supporting member 38 is made rotatable about the mounting bolt 34. The webbing supporting member 38 is formed with a vertical portion contiguous to the U-shaped portion reaching an approximately middle portion thereof and it is formed with a bent portion contiguous to the vertial portion bent in a direction of separation from the side wall 18 in the suspended situation of the webbing supporting memeber 38, as shown in FIG. 3. Also, the webbing supporting member 38 is further formed with a J-shaped portion contiguous to the bend portion reaching the other end portion thereof, the J-shaped portion functioning as a supporting portion 40 for turning and supporting the webbing 12. The supporting portion 40 is positioned nearer to the occupant 16 than a portion of the webbing 12 positioned between the webbing retractor 24 and the slip ring 30, i.e., farther from the side wall 18 than the portion of the webbing 12 thus positioned. In additon, a portion of the webbing 12 turned back by the slip ring 30 to reach the tongue plate 22 is positioned nearer to a central portion of a width direction of the vehicle body than the supporting portion 40 in an ordinarily used situation of the webbing 12, but the portion of the webbing 12 thus turned back to reach the tongue plate 22 can be turned back and supported on the supporting portion 40, as necessary, as shown with a double-dotted line in FIG. 3, so that a portion of the webbing 12 positioned between the supporting portion 40 and the slip ring 30 is positioned nearer to the side wall 18 of the vehicle body than the turning and supporting portion 40.

Description will now be given of operation of the first embodiment thus constructed.

When the tongue plate 22 is latched to the buckle device 26 after the occupant 16 sits on the seat 14, the occupant 16 is put in a restrained situation by the seatbelt system of 3-point type. A portion of the webbing 12 positioned between the anchor plate 20 and the tongue plate 22 functions to restrain a lap portion of the occupant 16 and a portion thereof positioned between the tongue plate 22 and the webbing support device 10 functions to restrain a torso of the occupant 16.

Also, in case that the seatbelt system is applied to an occupant having a small physical build different from an ordinary one, such as a child, a portion of the webbing 12 between the slip ring 30 and the tongue plate 22 can be supported by the supporting portion 40, whereby an anchor point of the webbing 12 restraining a torso of the occupant is changed corresponding to the physical build, so that the occupant is put in a confortably restrained situation by the webbing 12. In this connection, the slip joint is rotatable about the mounting bolt 34 and the webbing supporting member 38 is also rotatable about the spacer 36 as set forth above, whereby when the occupant 16 is restrained by the webbing 12, the slip joint and the webbing supporting member 38 are rotated in such a manner that the webbing fits the occupant.

Figure 4:
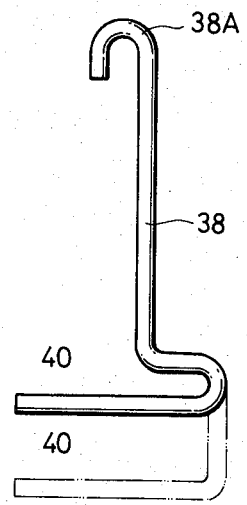
FIG. 4 is a front view showing a rod material 38 of a first embodiment.

In this embodiment, the webbing supporting member 38 can additionally be fixed thereto with another supporting portion 40, i.e., the supporting portion 40 is formed in a multi-stage, as shown with a double-dotted line in FIG. 4, whereby the anchor point for the shoulder portion of the occupant 16 can be changed in a multi-step manner.

Figure 5:
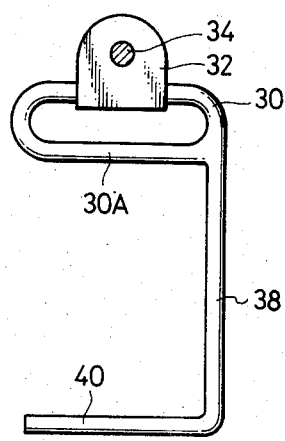
FIG. 5 is a front view of a second embodiment according to the present invention.

In FIG. 5, there is shown a second embodiment according to the present invention in which a portion of the slip ring 30 is fixed with a forward end portion of the webbing supporting member 38.

In this embodiment, accordingly, the webbing supporting member 38 is rotatable about the mounting bolt 34 together with the slip ring 30 but the substantially same function and effect as the first embodiment can be obtained. In this connection, the slip ring 30 and the webbing supporting member 38 are made integrally of a rod material.

Figure 6:
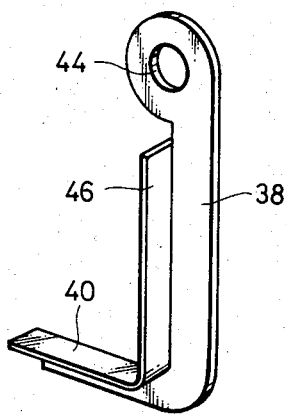
FIG. 6 is a perspective view showing a third embodiment according to the present invention.

Next, in FIG. 6, there is shown a third embodiment according to the present invention in which plate material is used as the webbing supporting member 38 instead of the rod material of the first and the second embodiments. The webbing supporting member 38 is formed substantially in an L-shape, which is formed at an end portion of a long side thereof with a circular hole 44 receiving the mounting bolt 34 therein. A short side of the webbing supporting member 38 is applied as the supporting portion 40. The webbing supporting member 38 is further formed with a bent portion 46 running from an almost middle portion of the long side to an end portion of the short side in a manner to have a sectional configural of an L shape at the bent portion 46, whereby the webbing supporting member 38 is reinforced.

As a result, in the third embodiment, also, the webbing supporting member 38 is capable of supporting the webbing 12 at the support portion 40, so that the substantially same function and effect as the first and the second embodiments can be obtained.

What is claimed is:

1. A webbing support device for use in a seatbelt system of a vehicle for supporting an intermediate portion of an occupant restraining webbing positioned between the torso of an occupant and a webbing retractor mounted on a side wall of the vehicle body, comprising:

(a) a slip joint rotatably mounted on a side wall of the vehicle body through a mounting means which includes a spacing means for spacing said joint from said side wall, wherein the slip joint includes a slip ring having two sides substantially parallel to each other which are interconnected by two rounded end portions, and a connecting plate fixed to one of the sides and connected to the mounting means, the other side of which supports the intermediate portion of the webbing, and (b) a webbing supporting member connected to the mounting means and capable of supporting a portion of the webbing positioned between the slip joint and the torso of the occupant for providing an alternative anchor point for the webbing restraining the torso of the occupant, whereby the anchor point of the webbing for the torso may be adjusted according to the physical build of the occupant restrained thereby, and, wherein the webbing supporting member is made of rod material which is formed at one end with a U-shaped portion through which the webbing supporting member is suspended rotatably from the spacer, and which is formed at the other end with a supporting portion capable of supporting the webbing.

2. A webbing support device as set forth in claim 1, wherein the webbing supporting member includes a vertical portion contiguous to the U-shaped portion and a bent portion contiguous to the vertical portion bent in a direction of separation from the side wall of the vehicle in the suspended situation of the webbing supporting member.

3. A webbing support device as set forth in claim 2, wherein the supporting portion of the webbing supporting member is formed in a multi-stage, whereby the anchor point of the webbing for the torso of the occupant can be changed in a multi-step manner.

4. A webbing support device as set forth in claim 2, wherein the supporting portion of the webbing supporting member is formed in a J shape.

5. A webbing support device for use in a seatbelt system of a vehicle for supporting an intermediate portion of an occupant restraining webbing positioned between the torso of an occupant and a webbing retractor mounted on a side wall of the vehicle body, comprising:
   (a) a slip joint rotatably mounted on a side wall of the vehicle body through a mounting means which includes a spacing means for spacing said joint from said side wall, and
   (b) a webbing supporting member connected to the mounting means and capable of supporting a portion of the webbing positioned between the slip joint and the torso of the occupant for providing an alternative anchor point for the webbing restraining the torso of the occupant, whereby the anchor point of the webbing for the torso may be adjusted to the physical build of an occupant restrained thereby, and
   wherein the webbing supporting member is made of plate material, which is substantially L-shaped shape, an end portion of one side thereof being formed with a circular hole penetrated by the mounting means, and the other side thereof being applied as the supporting portion capable of supporting the webbing.

6. A webbing support device as set forth in claim 5, wherein the webbing supporting member is formed with a bent portion bent in a manner to have a sectional configuration of a L shape, whereby the webbing supporting member is reinforced.

7. A webbing support device adapted for use in a seatbelt system for supporting an intermediate portion of an occupant restraining webbing positioned between a torso of the occupant and a webbing retractor retracting the webbing therein on a vehicle body, which comprises:
   (a) a slip ring made of rod material and formed in an oval shape having two sides parallel to each other, one of the two sides supporting the intermediate portion of the webbing;
   (b) a connecting plate secured to the other of the two sides of the slip ring and mounted on the side wall of the vehicle body through a mounting bolt rotatably thereabout;
   (c) a spacer of a tubular shape penetrated by the mounting bolt and disposed between the connecting plate and the side wall of the vehicle body, whereby the connecting plate is kept in a rotatable situation; and
   (d) a webbing supporting member made of rod material and suspended through one end portion thereof from the spacer, the other end portion of which is formed with a supporting portion capable of supporting a portion of the webbing positioned between the slip ring and the torso of the webbing, whereby an anchor point of the webbing for the torso of the occupant can be changed corresponding to a physical build of an occupant restrained by the webbing.

8. A webbing support device as set forth in claim 7, wherein the one end portion of the webbing supporting member is formed in a U shape, so that the webbing supporting member is made rotatable about the spacer, and the other end portion is formed in a J shape.

9. A webbing support device as set forth in claim 8, wherein the webbing supporting member includes a vertical portion contiguous to the U-shaped portion and a bent portion contiguous to the vertical portion bent in a direction of separation from the side wall of the vehicle body in the suspended situation of the webbing supporting member.

10. A webbing support device as set forth in claim 7, wherein the supporting portion of the webbing supporting member is formed in a multi-stage, whereby the anchor point of the webbing for the torso of the occupant can be changed in a multi-step manner.

11. A webbing support device as set forth in claim 7, wherein a portion of the slip ring and the one end portion of the webbing supporting member are fixed to each other to be supported on the mounting bolt rotatably thereabout.

12. A webbing support device as set forth in claim 7, wherein the slip ring and the webbing support member are formed integrally of rod material to be supported on the mounting bolt rotatably thereabout.

13. A webbing support device adapted for use in a seatbelt system for supporting an intermediate portion of an occupant restraining webbing positioned between a torso of the occupant and a webbing retractor retracting the webbing therein on a vehicle body, which comprises:
   (a) a slip ring made of rod material and formed in an oval shape having two sides parallel to each other, one of the two sides supporting the intermediate portion of the webbing;
   (b) a connecting plate secured to the other of the two sides of the slip ring and mounted on the side wall of the vehicle body through a mounting bolt rotatably thereabout;
   (c) a spacer of a tubular shape penetrated by the mounting bolt and disposed between the connecting plate and the side wall of the vehicle body, whereby the connecting plate is kept in a rotatable situation; and
   (d) a webbing supporting member formed of plate material in an L shape, a long side thereof being formed at an end portion thereof with a circular hole inserted by the mounting bolt and supported rotatably thereabout and a short side thereof being applied as the supporting portion capable of supporting the webbing, whereby an anchor point of the webbing for the torso of the occupant can be changed corresponding to physical build of an occupant restrained by the webbing.

14. A webbing support device as set forth in claim 13, wherein the webbing supporting member is formed with a bent portion bent in a manner to have a sectional configuration of a L shape, whereby the webbing supporting member is reinforced.

15. A webbing support device as set forth in claim 14, wherein the bent portion reaches the end portion of the short side of the L shape from an intermediate portion of the long side thereof.

16. A webbing support device for use in a seatbelt system of a vehicle for supporting an intermediate portion of an occupant restraining webbing positioned between the torso of an occupant and a webbing retractor mounted on a side wall of the vehicle body, comprising:
   (a) a slip joint rotably mounted on a side wall of the vehicle body through a mounting means which includes a spacing means for spacing said joint from said wall, wherein the slip joint includes an oval slip ring having two sides substantially parallel to each other, one of the sides being fixed to a connecting plate connected to the mounting means, the other side of which supports the intermediate portion of the webbing, and (b) a webbing supporting member connected to the mounting means and capable of supporting a portion of the webbing positioned between the slip joint and the torso of the occupant for providing an alternative anchor point of the webbing for the torso of the occupant, said webbing supporting member being connected to said slip ring of said slip joint in order that said webbing supporting member and said slip ring will rotate together on said side wall.

17. A webbing support device for use in a seatbelt system of a vehicle for supporting an intermediate portion of an occupant restraining webbing positioned between the torso of an occupant and a webbing retractor mounted on a side wall of the vehicle body, comprising:

(a) a slip joint rotatably mounted on a side wall of the vehicle body through a mounting means which includes a spacing means for spacing said joint from said side wall, wherein the slip joint includes an oval slip ring having two sides substantially parallel to each other, one of the sides being fixed to a connecting plate connected to the mounting means, the other side of which supports the intermediate portion of the webbing, and (b) a webbing supporting member connected to the mounting means and capable of supporting a portion of the webbing positioned between the slip joint and the torso of the occupant for providing an alternative anchor point of the webbing which restrains the torso of the occupant, wherein said slip ring and said webbing supporting member are integrally formed from the same rod material so that they will rotate together on the side wall of the vehicle body.

18. A webbing support device adapted for use in a seatbelt system for supporting an intermediate portion of an occupant restraining webbing positioned between a torso of the occupant and an anchor point of the webbing on the side wall of a vehicle body, which comprises:

(a) a first webbing supporting member rotatably mounted on a single fixed point of the side wall of the vehicle body through a mounting means for supporting the webbing on the side wall of the vehicle body, and (b) a second webbing supporting member rotatably mounted on the mounting means with the first webbing supporting member and capable of supporting a portion of the webbing positioned between the first webbing supporting member and the torso of the occupant, whereby the anchor point of the webbing for the torso of the occupant can be changed corresponding to physical build of an occupant restrained by the webbing.

19. A webbing support device as set forth in claim 18, wherein a spacer penetrated therein by the mounting means is disposed between the first supporting member and the side wall of the vehicle body, whereby the first supporting member can be rotated.

20. A webbing support device as set forth in claim 19, wherein the first supporting member includes a slip ring formed in an oval shape having two sides substantially parallel to each other and a connecting plate fixed to one of the sides and penetrated by the mounting means, the other thereof supporting the intermediate portion of the webbing.

21. A webbing support device as set forth in claim 18, wherein the supporting portion of the second webbing supporting member is formed in a multi-stage, whereby the anchor point of the webbing for the torso of the occupant can be changed in a multi-step manner.

22. A webbing support device as set forth in claim 18, wherein the supporting portion of the second webbing supporting member is formed in a J shape.

* * * * *